Figure 1:
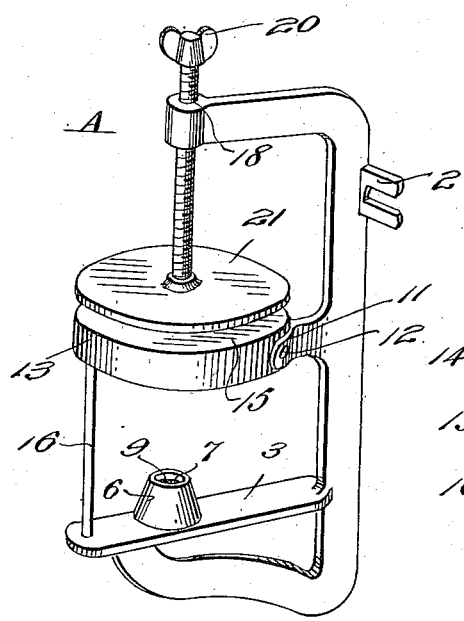

J. MICHEL.
VULCANIZER.
APPLICATION FILED NOV. 15, 1916.

1,218,441.

Patented Mar. 6, 1917.

Witness
H. S. McDowell

Inventor
John Michel,
By Victor J. Evans
Attorney

UNITED STATES PATENT OFFICE.

JOHN MICHEL, OF PHILADELPHIA, PENNSYLVANIA.

VULCANIZER.

1,218,441.   Specification of Letters Patent.   Patented Mar. 6, 1917.

Application filed November 15, 1916. Serial No. 131,528.

*To all whom it may concern:*

Be it known that I, JOHN MICHEL, a citizen of the United States, residing at Philadelphia, in the county of Philadelphia and State of Pennsylvania, have invented new and useful Improvements in Vulcanizers, of which the following is a specification.

This invention relates to vulcanizers of the type usually employed in the repair of pneumatic tires and tubes, or for mending other rubber articles.

The object of the invention is to provide a simple and efficient vulcanizer, primarily adapted for use in automobile repair shops for vulcanizing punctured or damaged pneumatic tires.

Another object of the invention is the provision of a vulcanizer of the above character which is of novel construction, reliable and practically automatic in operation, so that its action may be readily controlled by unskilled operators.

To this end the invention comprehends a vulcanizer comprising a stationary frame, a tire supporting table connected with said frame and positioned to coöperate with tire clamping mechanism, in order that a tire may be securely associated with said table, and a heating element being disposed beneath said table and so located that the heat arising therefrom will be concentrated upon the tire supporting table.

Further details of the invention will be readily understood upon reference to the following description and to the accompanying drawings, forming a part of this specification.

Figure 2:
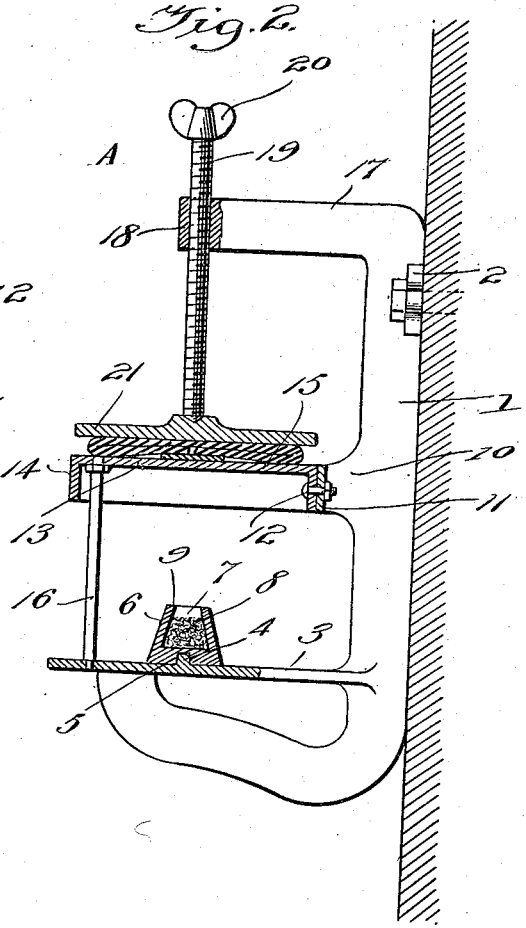

In the drawings,

Figure 1 is a perspective view of the vulcanizer comprising the present invention, and Fig. 2 is a vertical sectional view taken through the same.

Similar characters of reference denote corresponding parts throughout the several views of the drawing.

Referring more particularly to the detailed construction of the present invention in its preferred form, the same consists of a vulcanizer A, embodying a main supporting frame 1, of cast iron construction. The frame is provided with integral offset lugs 2, which are apertured to receive suitable securing elements, through the medium of which the frame may be readily secured to a stationary support and thus maintained in an operative position.

The frame 1 is provided with an integral horizontally disposed shelf 3, located contiguous to the lower portion of the frame, and said shelf is provided with an upwardly extending stud 4, operable to be received within a recess 5, formed in the lower surface of a heating element or cup 6, to prevent the accidental displacement of the cup from the shelf while the vulcanizer is in use and also to enable the cup to be centered beneath a table hereinafter described. The cup 6 is preferably formed separate from the shelf 3, so that it may be conveniently filled with an allotted quantity of fuel, which will burn for a predetermined period of time. The cup is preferably formed from metal and is provided in its upper surface with a fuel receiving well 7, the latter being adapted to receive a quantity of fibrous like material 8, in order that the fuel when placed within the well will be absorbed by said material. A screen 9 covers the material 8 and prevents the latter from accidentally falling out of its proper position. By placing a predetermined quantity of fuel within the well 7, the action of the heating element may be readily governed, that is, by placing a known quantity of fuel within the cup, the period of time the same will burn may be clearly determined.

An integral table supporting arm 10 extends outwardly from the frame 1 at a point above the shelf 3 and is provided with offset apertured lugs 11. Secured to the lugs 11 by means of bolts or the like 12 is a tire receiving table 13. The table is preferably formed from aluminum and is substantially cup shaped in cross section, being provided with an annular flange 14 and a flat working surface 15. A post 16 is secured to the outer extremity of the shelf 3 and to the outer portion of the table 13, said post being employed to increase the rigidity of the table 13 and serve as a guard to prevent the cup from being struck by articles while being connected with the vulcanizer, as will be clearly understood.

The upper extremity of the frame 1 is formed with an outwardly extending arm 17 which terminates in vertical alinement with the axis of the table 13. The arm 17 is provided with a screw threaded bearing 18 operable to receive a pressure screw 19. A manipulating handle 20 is formed with the screw 19, so that the same may be readily rotated to assume various vertical positions. The lower extremity of the screw 19 is adapted to coöperate with a pressing plate 21, which is normally arranged immediately above the working surface 15 of the table 13, and is of substantially the same contour as the surface 15. It will be seen that by operating the screw 19 the relation between the plate 21 and the table 13 may be readily controlled.

In operation, a tire to be mended is positioned upon the surface 15 and is held suspended from the latter, the damaged portion of the tire being placed contiguous to the surface 15, the damaged portion being spaced from the surface 15 by a repairing patch of soft rubber. The plate 21 is then placed on the upper side of the tire so that upon the manipulation of the screw 19, the plate will clamp the tire in a secured position upon the table 13. After this operation has been completed, the fuel within the heating cup 6 is ignited, so that the heat emitted by the latter will be concentrated upon the surface 15. As stated before, an allotted quantity of fuel is placed within the cup 6 and is permitted to burn until entirely consumed. The heat derived from the cup 6 will be sufficient to fuse a repair patch to the body of the tire. After the heating action the tire is permitted to remain within the vulcanizer until the rubber has cooled and hardened whence it may be removed in repaired condition.

Having described the invention, what is claimed as new and patentable is:—

1. In a device of the class described, a frame, a shelf on said frame, a stud on said shelf, and a fuel holder supported by said shelf and having a socket in the bottom thereof receiving said stud.

2. In a device of the class described, a frame, a table thereon, a shelf on said frame underlying said table and spaced therefrom, a stud on said shelf alining with the center of said table, a fuel holder retained on said shelf by said stud, and a guard member serving as an auxiliary support for said table having connection therewith and with said shelf.

In testimony whereof I affix my signature.

JOHN MICHEL.

Copies of this patent may be obtained for five cents each, by addressing the "Commissioner of Patents, Washington, D. C."